(12) United States Patent
Podnar

(10) Patent No.: US 10,016,902 B2
(45) Date of Patent: Jul. 10, 2018

(54) ROBOT END EFFECTORS THAT CARRY OBJECTS

(71) Applicant: The Boeing Company, Chicago, IL (US)

(72) Inventor: Gregg W. Podnar, Lakewood, OH (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/340,590

(22) Filed: Nov. 1, 2016

(65) Prior Publication Data

US 2018/0117775 A1    May 3, 2018

(51) Int. Cl.
| | | |
|---|---|---|
| *B25J 15/08* | (2006.01) | |
| *B65G 47/90* | (2006.01) | |
| *B25J 15/00* | (2006.01) | |
| *B25J 15/02* | (2006.01) | |

(52) U.S. Cl.
CPC ............ *B25J 15/08* (2013.01); *B25J 15/0004* (2013.01); *B25J 15/022* (2013.01); *B65G 47/90* (2013.01)

(58) Field of Classification Search
CPC ...... B25J 5/007; B25J 9/1065; B25J 11/0045; B25J 15/0004; B25J 15/0014; B25J 15/022; B25J 15/08; B25J 15/10; B25J 15/12; B25J 19/021–19/025; B25B 35/243; B64F 1/368; B65G 47/90
USPC ............ 294/86.4, 99.1, 106, 902; 414/797.2, 414/797.6
See application file for complete search history.

(56) References Cited

U.S. PATENT DOCUMENTS

| | | | | |
|---|---|---|---|---|
| 4,680,818 | A | * 7/1987 | Ooka | A61G 7/103 5/81.1 C |
| 5,265,712 | A | * 11/1993 | Krieg | B65G 59/023 198/512 |
| 5,414,973 | A | * 5/1995 | Muller | B65B 25/20 53/259 |
| 6,580,046 | B1 | 6/2003 | Koini et al. | |
| 6,629,594 | B2 | * 10/2003 | Nagel | B65G 47/90 198/468.6 |
| 7,004,524 | B2 | * 2/2006 | Marshall | B25B 9/00 294/86.4 |
| 7,021,449 | B2 | 4/2006 | Koini et al. | |
| 7,051,664 | B2 | * 5/2006 | Robichaud | A01D 44/00 114/312 |
| 9,539,729 | B2 | * 1/2017 | Tanaka | B25J 15/0014 |
| 2004/0232716 | A1 | * 11/2004 | Reed | B25J 15/00 294/86.4 |
| 2010/0145502 | A1 | * 6/2010 | Kratzmaier | B64F 1/32 700/218 |

(Continued)

FOREIGN PATENT DOCUMENTS

WO    WO-2015132033 A1 *  9/2015  ............ B65G 47/90

*Primary Examiner* — Dean J Kramer

(74) *Attorney, Agent, or Firm* — Duft Bornsen & Fettig LLP

(57) ABSTRACT

Systems and methods are provided for facilitating the operations of an end effector that grasps objects such as baggage. One exemplary embodiment is a system that includes a finger of an end effector of a robot. The finger includes a finger base, a body that extends from the finger base, a first continuous friction belt having an exposed portion along a first side of the body, and a second continuous friction belt having an exposed portion along a second side of the body.

28 Claims, 11 Drawing Sheets

(56) References Cited

U.S. PATENT DOCUMENTS

2010/0187846 A1* 7/2010 Crezee ................ B25J 15/0004
                                                          294/115
2011/0268548 A1* 11/2011 Doll ........................ B25J 15/00
                                                          414/688
2015/0314455 A1* 11/2015 Morency .............. B25J 15/0014
                                                          414/799

* cited by examiner

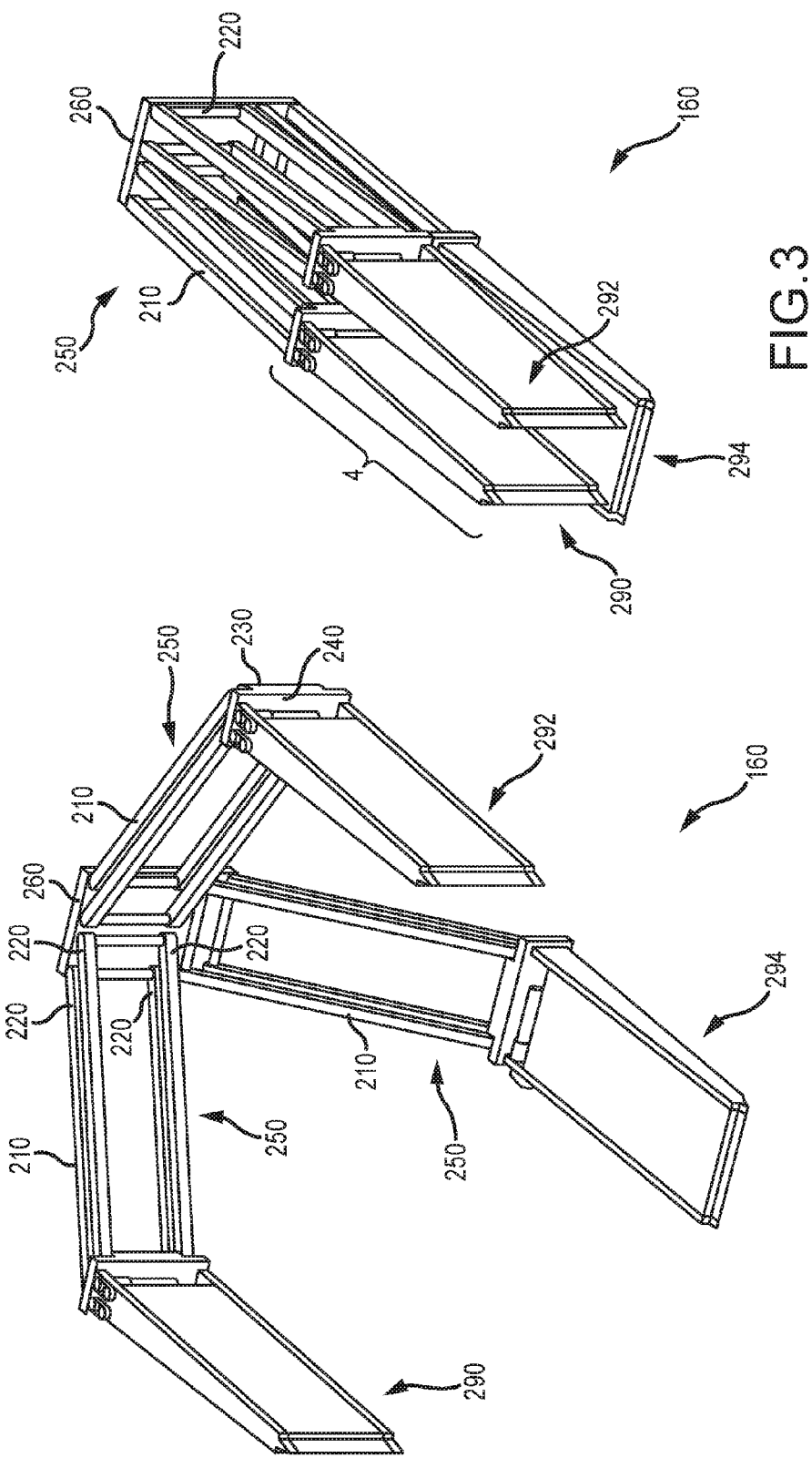

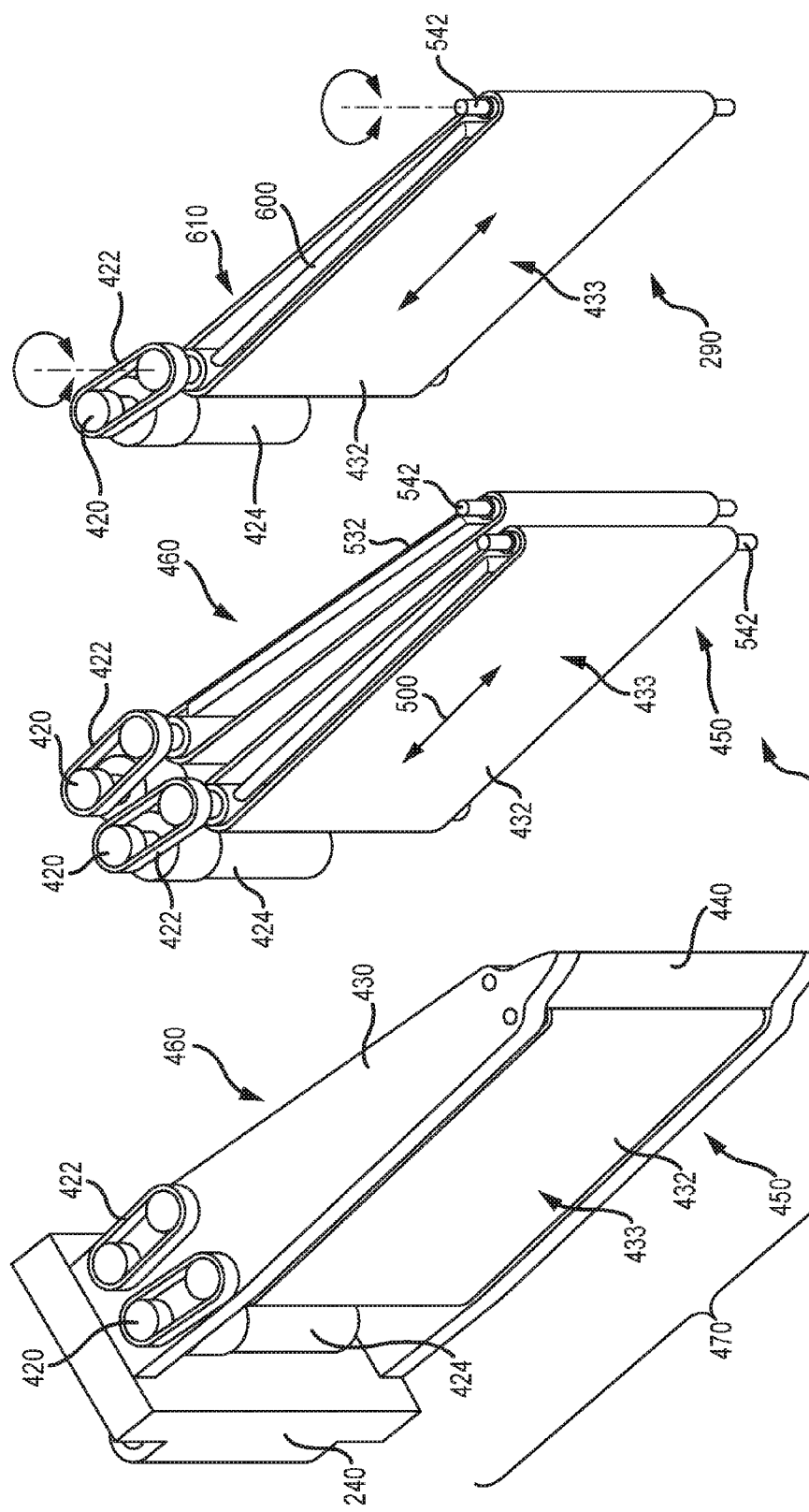

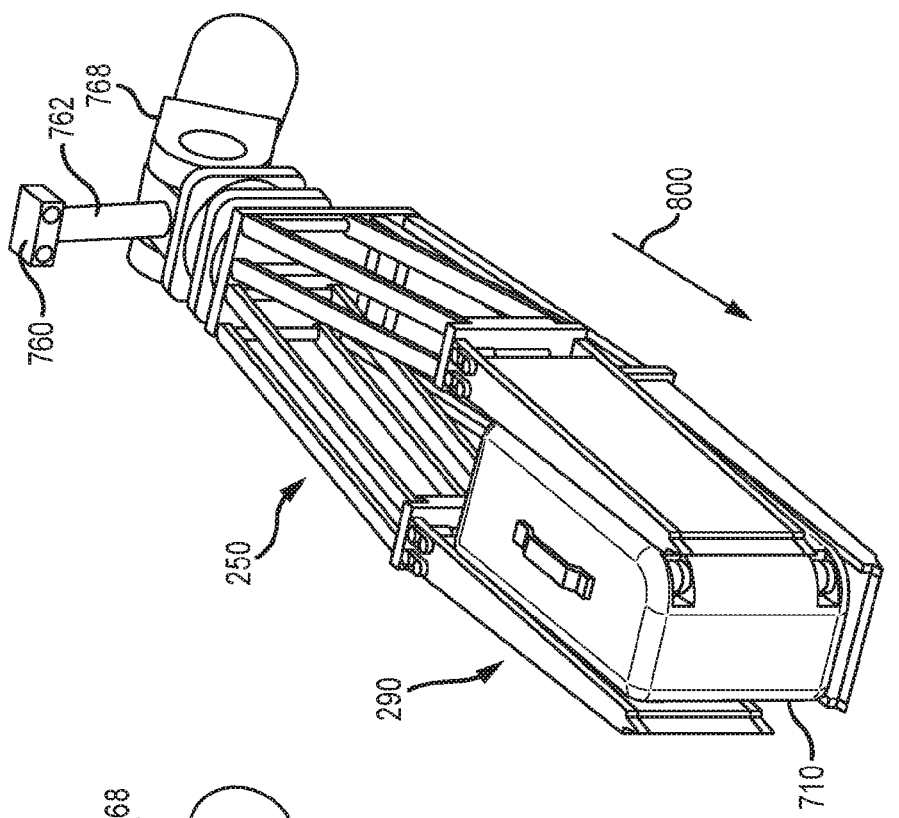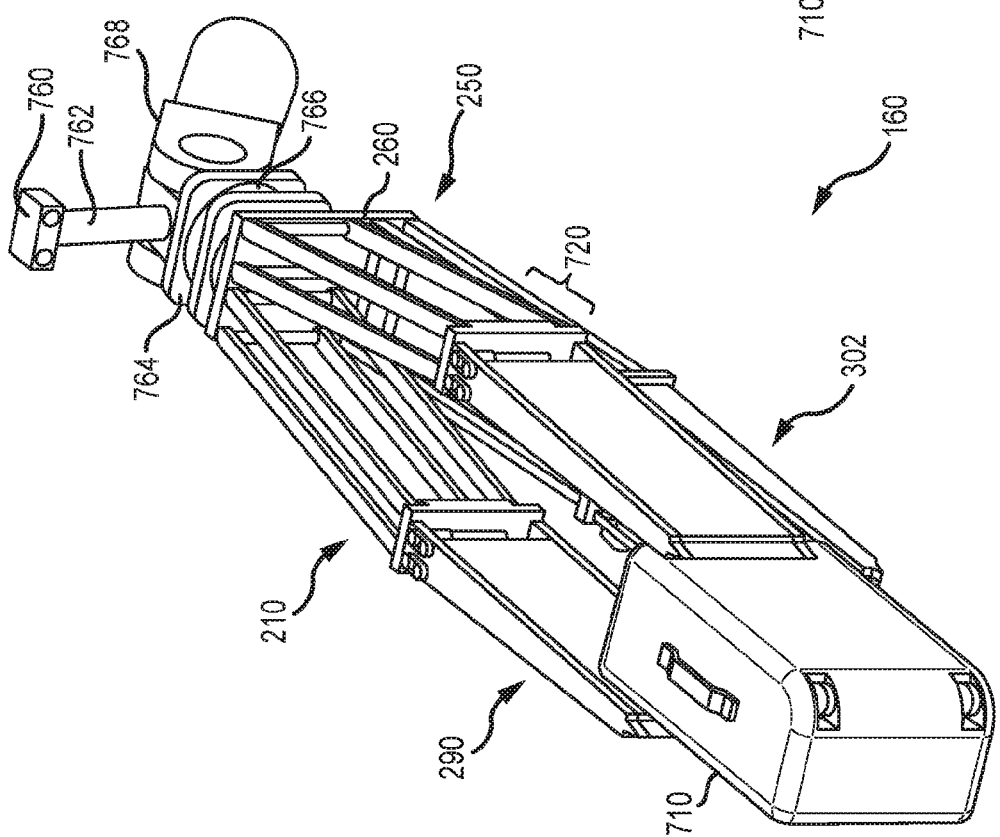

ROBOT END EFFECTORS THAT CARRY OBJECTS

FIELD

The disclosure relates to the field of robotics, and in particular, to end effectors for robots.

BACKGROUND

Robotic systems continue to advance in complexity and intelligence, facilitating the use of robotic systems as labor-saving devices. For example, a robot arm may be utilized to perform a repetitive task along an assembly line, reducing the need for a technician to perform the task. Robot arms may also be utilized in order to facilitate activities performed by a technician. For example, a robot arm may be used by a technician in order to lift objects that are too heavy for the technician to manage, to move the technician to a desired location at a large object (e.g., an aircraft), etc. Many robotic arms utilize an end effector that is capable of performing work such as drilling, riveting, etc. Another example of an end effector is a grasping device.

While robots already utilize a variety of grasping devices, it remains desirable to enhance the capabilities of such grasping devices to ensure that robot arms are capable of efficiently grasping and conveying objects in a manner desired by a technician.

SUMMARY

Embodiments described herein provide end effectors that include grasping fingers having friction belts with exposed portions. As an end effector is moved towards an object (e.g., for grasping), the friction belts are driven, causing their exposed portions to advance in a direction opposed to the motion of the end effector. The distance which the friction belts are driven may, for example, correspond to the magnitude of movement of the end effector. In this manner, when the end effector is inserted into a stack of objects (e.g., a stack of checked luggage for an aircraft), the moving friction belts allow the end effector to be smoothly inserted into a stack of objects without disrupting those objects.

One embodiment is a system that includes a finger of an end effector of a robot. The finger includes a finger base, a body that extends from the finger base, a first continuous friction belt having an exposed portion along a first side of the body, and a second continuous friction belt having an exposed portion along a second side of the body.

A further embodiment is a method that includes, for each of multiple fingers of an end effector as the end effector moves forward towards an object: driving a first friction belt along a first side of the finger causing an exposed portion of the first friction belt to advance in response to motion of the end effector, and driving a second friction belt along a second side of the finger causing an exposed portion of the second friction belt to advance in response to motion of the end effector.

Another embodiment is a method that includes placing a finger between two objects. This includes driving a first friction belt along a first side of the finger causing an exposed portion of the first friction belt to advance in response to motion of the end effector, the exposed portion of the first friction belt facing a first of the two objects, and driving a second friction belt along a second side of the finger causing an exposed portion of the second friction belt to advance in response to motion of the end effector, the exposed portion of the second friction belt facing a second of the two objects. The method further includes moving the end effector relative to the two objects.

A further embodiment is a non-transitory computer readable medium embodying programmed instructions which, when executed by a processor, are operable for performing a method. The method includes, for each of multiple fingers of an end effector as the end effector moves forward towards an object: driving a first friction belt along a first side of the finger causing an exposed portion of the first friction belt to advance in response to motion of the end effector, and driving a second friction belt along a second side of the finger causing an exposed portion of the second friction belt to advance in response to motion of the end effector.

Yet another embodiment is an apparatus. The apparatus includes a rigid frame, an axle rotatably mounted to a base of the frame, wheels attached to ends of the axle, and a finger attached to the base of the frame that protrudes from the base of the frame. The finger includes a first drivable friction belt having an exposed portion that defines an upper surface of the finger, and a second drivable friction belt having an exposed portion that defines a lower surface of the finger.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 2-3 are diagrams illustrating displacement of fingers of an end effector by operation of linkages in an exemplary embodiment.

FIGS. 4-6 are diagrams illustrating a finger of an end effector in an exemplary embodiment.

FIG. 7 is a diagram of an end effector of a robot retrieving an object in an exemplary embodiment.

FIGS. 8-9 are diagrams further illustrating retrieval of an object by an end effector in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
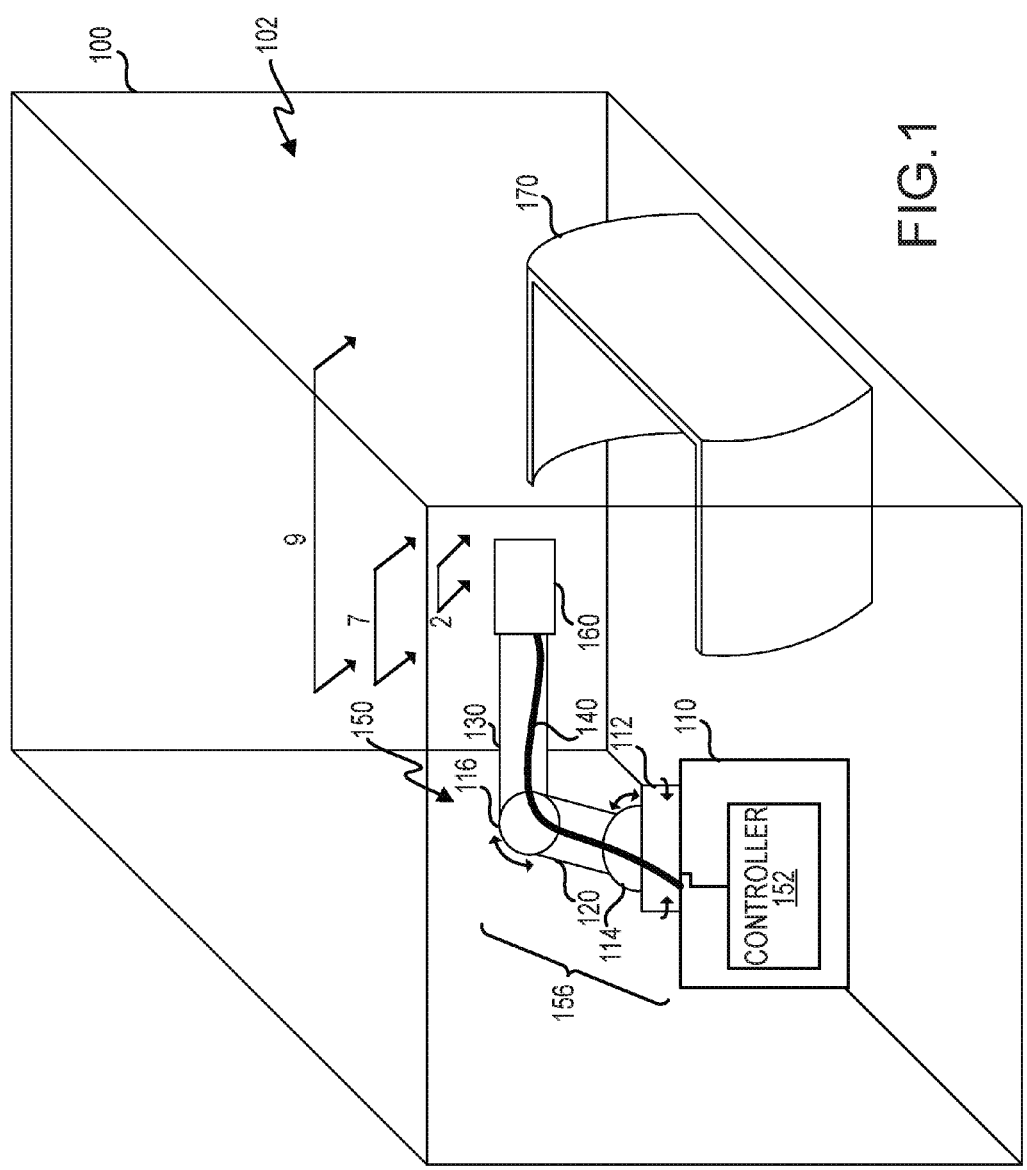
FIG. 1 is a diagram of a robot in an exemplary embodiment.

FIG. 1 is a block diagram of robot 150 operating in work space 100 in an exemplary embodiment. Work space 100 comprises any volume of space in which robot 150 is expected to operate to facilitate retrieval and/or manipulation of objects. For example, work space 100 may comprise an enclosed space, or an open volume of space on a piece of tarmac proximate to a cargo hold of an aircraft. According to FIG. 1, work space 100 includes volume 102, mount 110, robot 150 attached to mount 110, and storage area 170. Mount 110 may comprise a structural component occupying a fixed location within work space 100, or may comprise a mobile feature (e.g., a cart) capable of being driven across the tarmac in order to move robot 150 to various desired locations. Robot 150 (also referred to as a "robotic arm") is mounted to mount 110, and includes multiple actuators (112, 114, 116) and rigid bodies (120, 130) which together define a kinematic chain 156. Robot 150 also includes dressing 140 (e.g., cabling), and end effector 160, which is capable of performing grasping upon objects stowed in storage area 170. Further details of end effector 160 will be described with regard to FIGS. 2-12.

Controller 152 directs the operations of robot 150, including kinematic chain 156 and end effector 160. Controller 152 may be implemented, for example, as custom circuitry, as a processor executing programmed instructions, or some combination thereof.

Features of end effector 160 are illustrated in FIGS. 2-6. Specifically, FIGS. 2-3 generally illustrate end effector 160, while FIGS. 4-6 focus upon specific components of end effector 160 that are referred to herein as "fingers." FIGS. 2-3 utilize the view shown by view arrows 2 of FIG. 1. As shown in FIG. 2, end effector 160 includes rigid linkages 250. Each linkage 250 includes rigid members 210 that are arranged in a parallelogram and are pivoted about end effector base 260 at joints 220, which are actuated to drive linkages 250. Specifically, each linkage 250 is attached to end effector base 260 via four joints 220. Although three linkages are shown, in further embodiments the number of linkages 250 may vary as desired (e.g., two linkages, four linkages, six linkages, etc.). Each rigid member 210 is also attached to a finger (290, 292, 294) at joints 230, which are attached to finger base 240. This enables each finger (290, 292, 294) to pivot about the linkage 250 to which it is attached.

In one embodiment, the distances between joints 220 and their corresponding joints 230 are the same. When rigid members 210 are of equal length, this ensures that when opposed linkages are driven together to pivot outward by the same amount, opposed fingers 290 and 292 remain parallel, which facilitates the grasping of objects having parallel sides (e.g., checked luggage for an aircraft). End effector 160 may be designed such that each linkage 250 is pivoted outward/inward by the same amount and operated by a single drive, such that opposed linkages 250 (e.g., pairs of linkages 250 which are capable of grasping an object when brought together) are driven outward/inward by the same amount, or such that each linkage 250 is driven independently. By driving linkages 250 to move fingers 290 and 292 towards each other, end effector 160 may grip an object. Thus, fingers 290 and 292 are opposed, are coupled with end effector base 260 via linkages 250, and may be drawn together in a grasping motion (akin to the pinching motion of a claw).

FIGS. 4-6 are diagrams illustrating finger 290 of end effector 160 in an exemplary embodiment. Specifically, FIGS. 4-6 utilize the view shown by view arrows 4 of FIG. 3. FIG. 4 illustrates a finger 290, FIG. 5 illustrates finger 290 with portions removed to highlight continuous friction belts 432 and 532, and FIG. 6 illustrates finger 290 with further portions removed to highlight a single friction belt 432. As shown in FIG. 4, finger 290 includes finger base 240, body 470 which tapers as it extends from finger base 240, and angled tip 440 which extends from body 470. In this embodiment, finger base 240 and/or body 470 include one or more motors 424 which drive shafts 420 (each shaft 420 driving a different continuous friction belt). Thus, one motor 424 may drive each continuous friction belt (432, 532). As shafts 420 are driven, drive belts 422 advance, which causes exposed portion 433 of friction belt 432 to advance. The exposed portions 433 of friction belts 432 and 532 define the left side (450) and right side (460) of finger 290, respectively. Tip 440 of finger 290 is angled to allow for insertion of finger 290 into narrow regions, while cover 430 protects friction belts 432 from damage. FIG. 5 illustrates that the exposed portion 433 of each friction belt (432 and 532) is capable of advancing and/or reversing in direction 500.

Furthermore, FIG. 5 illustrates that each friction belt 432 and 532 is oriented vertically (e.g., forming vertical faces of finger 290), and may be driven independently of the other friction belt. Friction belt 432, being located on the left side of finger 290, is distal from opposed finger 292. Meanwhile, friction belt 532, being on the right side of finger 290, is proximate to opposed finger 292. Shafts 542 are further illustrated, which rotate as friction belt 432 advances.

FIG. 6 focuses on further details of a friction belt 432, illustrating backing plate 600, which separates exposed portion 433 of friction belt 432 from hidden portion 610 of friction belt 432. Backing plate 600 ensures that as gripping pressure is applied by pivoting linkages 250 (and therefore fingers 290 and 292) together, excess pressure applied to an object for grasping does not cause exposed portion 433 to rub against hidden portion 610, which would hinder the motion of friction belt 432.

With the various components of end effector 160 described, the operations of end effector 160 during a luggage retrieval operation will now be discussed. FIGS. 7-8 are diagrams further illustrating retrieval of an object 710 (e.g., a piece of checked luggage for a passenger in an aircraft) by end effector 160 in an exemplary embodiment. Specifically, FIGS. 7-8 correspond with view arrows 7 of FIG. 1.

As illustrated in FIG. 7, imaging system 760 (e.g., a stereoscopic camera) is attached to end effector 160, and provides input for operating end effector 160. Imaging system 760 is attached via shaft 762 to pivot joint 768 (e.g., an actuated pivot joint). A rotatable coupling 764 is attached to a passive compliance 766 and rotates end effector base 260. Attached to end effector base 260 are linkages 250 which pivot about end effector base 260. Fingers 290 and 292 are each attached to a corresponding linkage 250 at a distal portion 720 of that linkage 250. As end effector 160 advances in direction 800, object 710 is conveyed into the volume between fingers 290. Hence, object 710 is retrieved into the grasp of end effector 160 as shown in FIG. 8.

Figure 9:
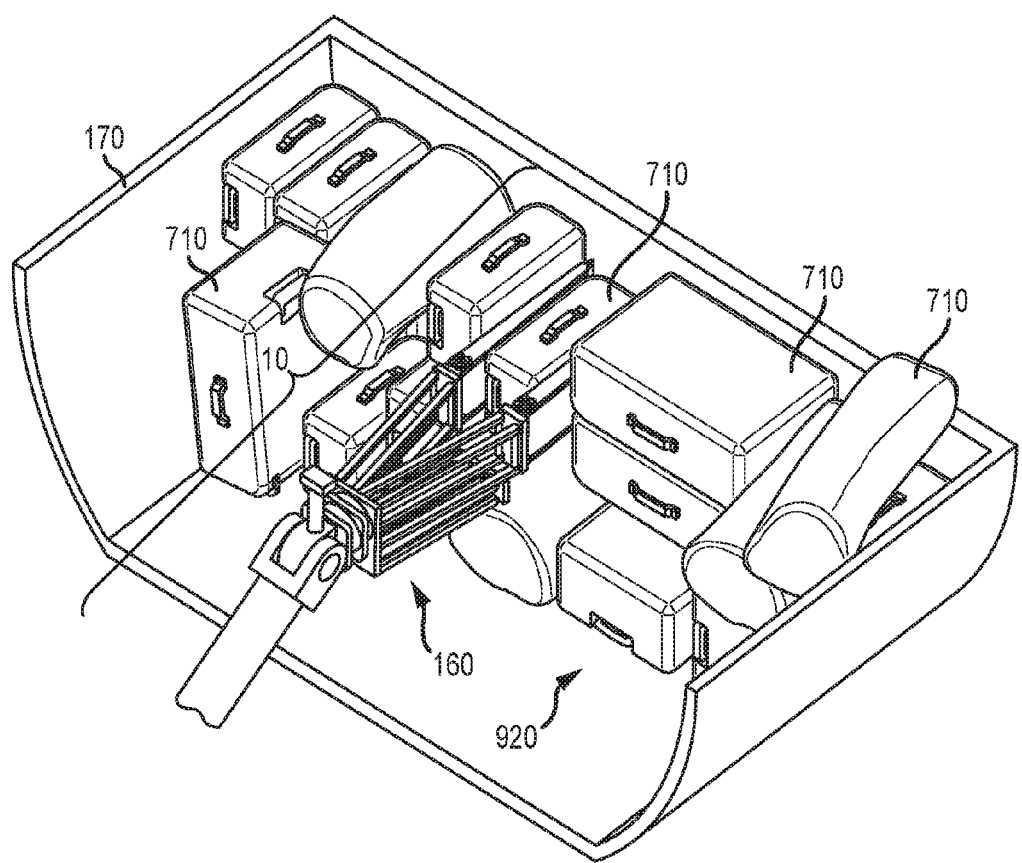

FIG. 9 is a diagram of end effector 160 of robot 150 retrieving an object 710 from storage area 170 in an exemplary embodiment. Specifically, FIG. 9 corresponds with view arrows 9 of FIG. 1. As shown in FIG. 9, end effector 160 is inserted into stack 920 of objects 710 for the purpose of retrieving a specific object 710.

Figure 10:
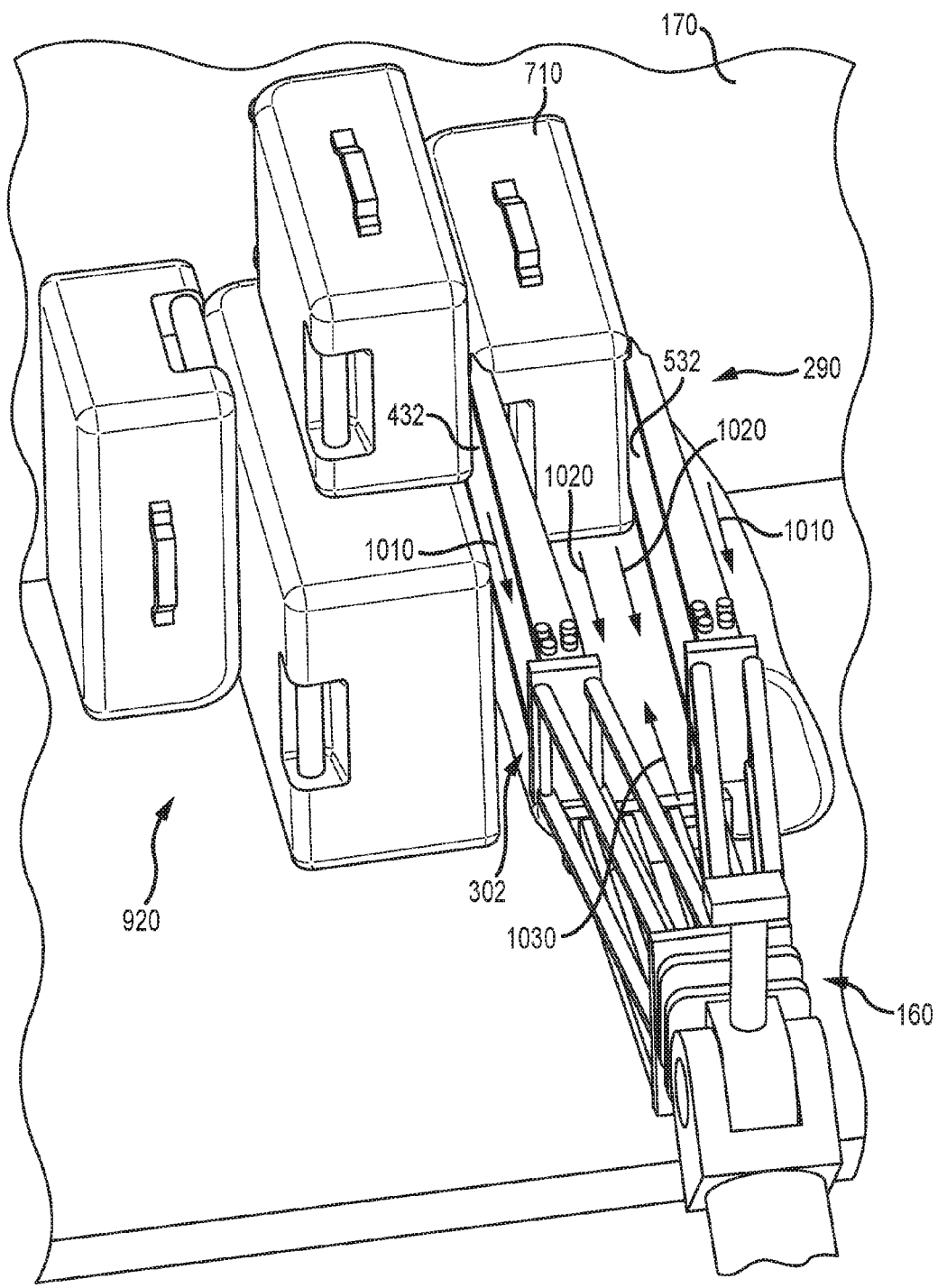
FIGS. 10-12 are diagrams detailing the operation of friction belts at fingers of an end effector during retrieval of an object in an exemplary embodiment.
Figure 11:
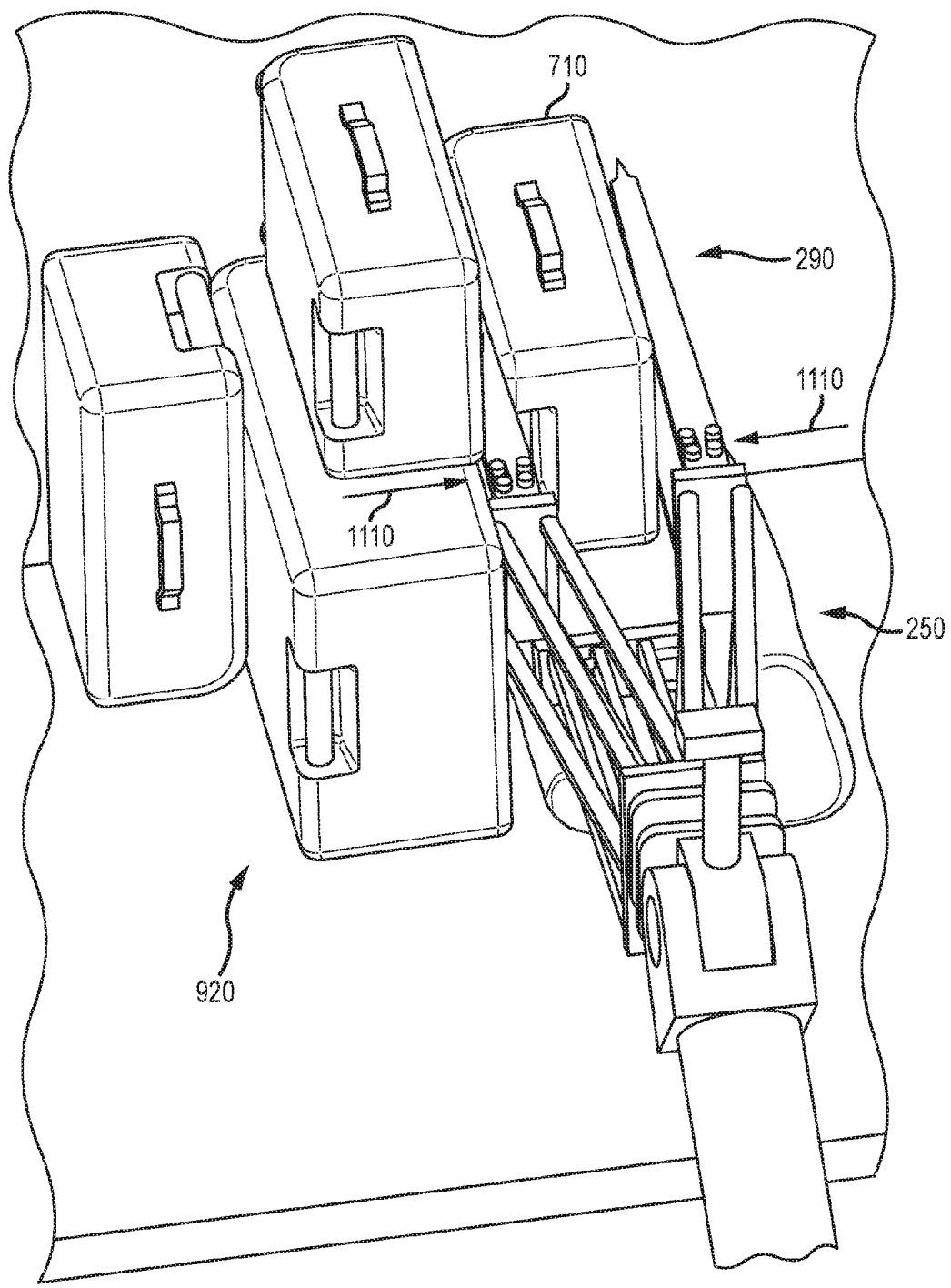
Figure 12:
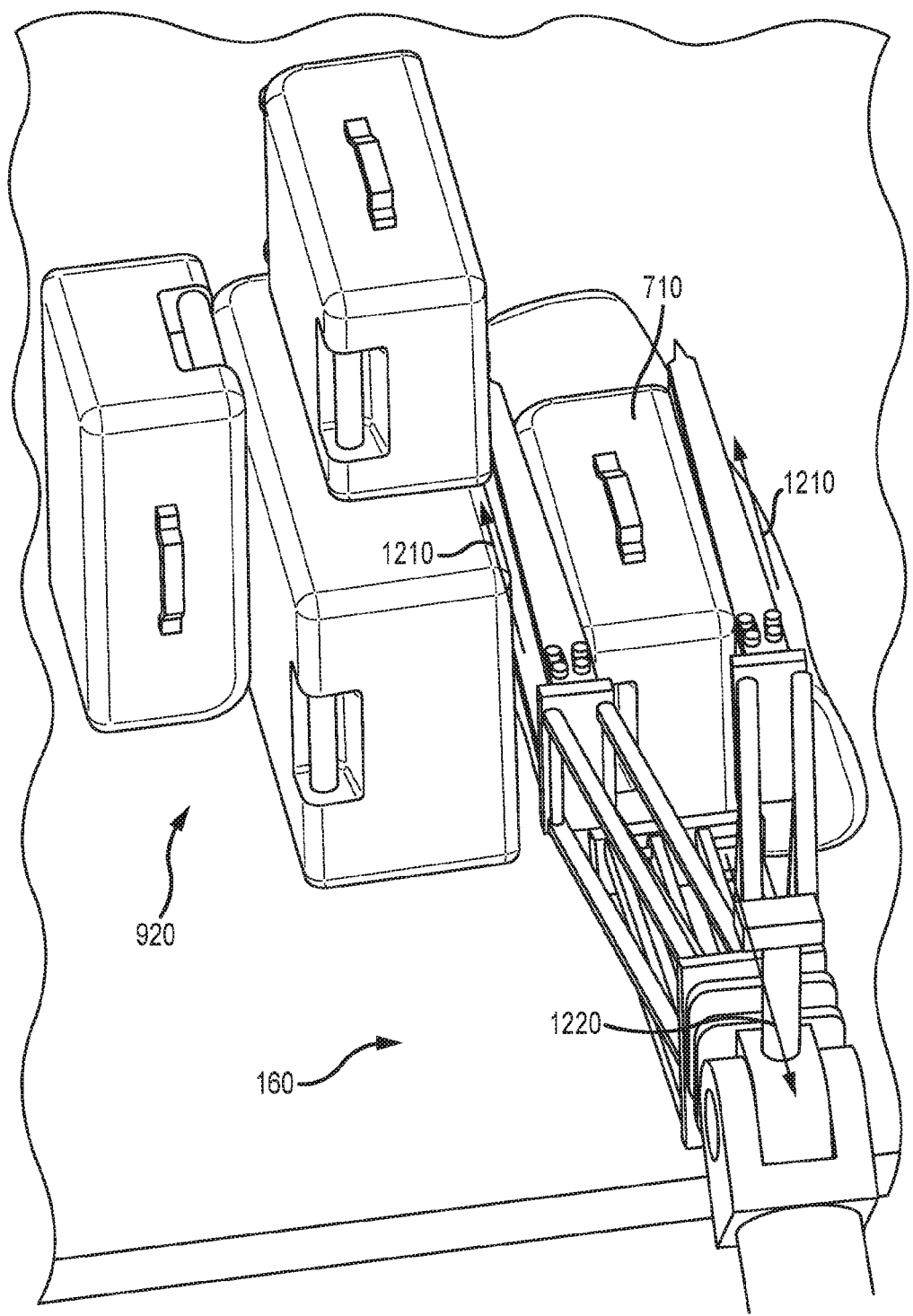

FIGS. 10-12 are diagrams detailing the operation of friction belts 432 at fingers 290 and/or 292 of end effector 160 during retrieval of an object in an exemplary embodiment. Specifically, FIGS. 10-12 correspond with view arrows 10 of FIG. 9. FIG. 10 illustrates initial insertion of end effector 160 into stack 920 of objects 710. Assume, for this embodiment, that fingers (290, 292, 294) have been positioned to correspond with the boundaries/edges of object 710. During forward motion of end effector 160 towards object 710 (as indicated by arrow 1030 and driven by actuators 112, 114, and/or 116), friction belts 432 and 532 engage in counter-motion. That is, friction belts 532, which border object 710 for grasping (i.e., friction belts 432 that are proximate to, as opposed to being distal from, an opposed finger) move according to arrows 1020, while friction belts 432 that do not border an object 710 intended for grasping move according to arrows 1010. In this manner, exposed portions of friction belts 432 and 532 advance in a direction opposed to the direction of end effector 160. When the amount of counter-motion of friction belts 532 corresponds in magnitude to the motion of end effector 160, belts 432 and 532 advance across object 710 without sliding/scraping across object 710.

After end effector 160 has been inserted into stack 920 to form a loose grip surrounding object 710, linkages 250 are pivoted to draw fingers (290, 292, 294) towards each other according to arrows 1110, resulting in end effector 160 tightening/establishing its grip upon object 710 and preparing object 710 for transit as shown in FIG. 11. After the grip has been tightened, end effector 160 may retract from stack 920 without dropping object 710.

FIG. 12 illustrates retraction of end effector 160 in order to retrieve object 710. During retraction, it is desirable that object 710 not slide out from the tightened grasp of end effector 160. At the same time, it is desirable that end effector 160 not scrape against other objects in stack 920, which may cause them to tumble off of stack 920. Thus, during retraction, inward-facing friction belts 532 of end effector (i.e., friction belts 532 which are directly in contact with the object 710 that is being grasped) may be held steady (e.g., by resting friction) or be braked in order to ensure that the object 710 being grasped remains held by end effector 160. Meanwhile, outward facing friction belts 432 of end effector 160 (friction belts 432 that are not in direct contact with object 710 being grasped) move in direction 1210, opposed to the direction 1920 of end effector 160 as end effector 160 retracts. This ensures that end effector 160 does not drag across external objects 710 during retraction.

Illustrative details of the operation of end effector 160 will be discussed with regard to FIG. 13. Assume, for this embodiment, that a technician is operating robot 150, and that robot 150 is proximate to a large stack 920 of objects 710 that are awaiting retrieval (e.g., for placement onto a baggage train or conveyor system).

Figure 13:
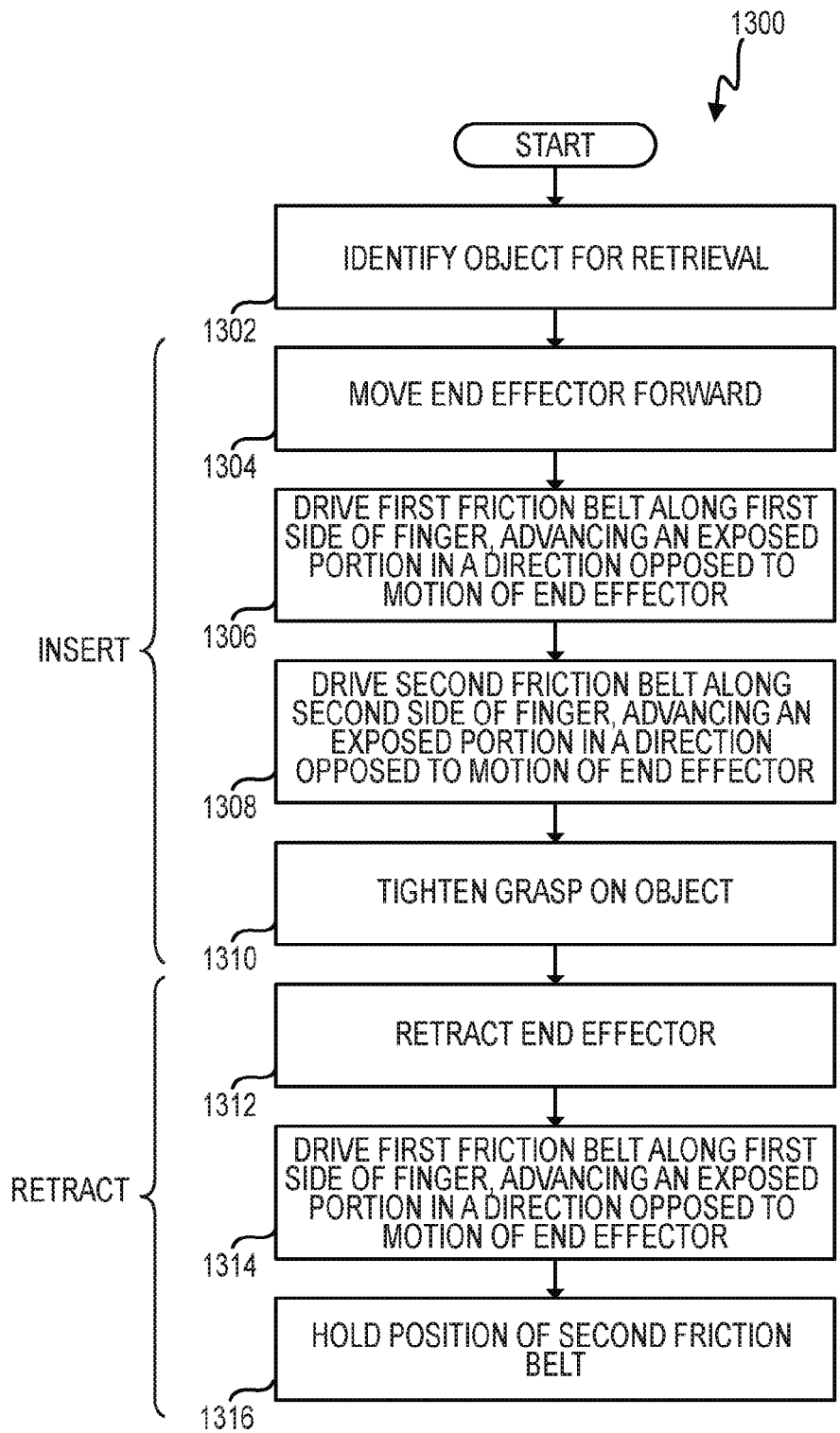
FIG. 13 is a flowchart illustrating a method for operating an end effector in an exemplary embodiment.

FIG. 13 is a flowchart illustrating a method 1300 for operating robot 150 in an exemplary embodiment. The steps of method 1300 are described with reference to end effector 160 of FIG. 1, but those skilled in the art will appreciate that method 1300 may be performed in other systems. The steps of the flowcharts described herein are not all inclusive and may include other steps not shown. The steps described herein may also be performed in an alternative order.

According to method 1300, an object 710 is identified for retrieval by end effector 160 (step 1302). This may comprise controller 152 operating imaging system 760 to identify an object 710 for retrieval, or receiving input from a user for retrieving an object 710. With an object 710 selected for retrieval, the retrieval process initiates, resulting in positioning of end effector 160 for insertion. This may comprise, for example, controller 152 identifying the boundaries of object 710. This aligns fingers (290, 292, 294) with the boundaries of object 710 (e.g., aligning a distance between fingers (290, 292, 294) to match the size of object 710, while holding fingers 290 and 292 parallel spaced wide enough to clear edges of the object to be grasped). With fingers (290, 292, 294) readily positioned, controller 152 operates kinematic chain 156 to reposition end effector 160, advancing end effector 160 forward towards object 710 (step 1304). End effector 160 may be initially aligned such that its forward motion during insertion occurs in direction 800 indicated in FIG. 4. That is, controller 152 may move end effector 160 directly towards the object 710, in a manner such that fingers (290, 292, 294) remain aligned with the boundary/edges of object 710 as end effector 160 advances.

As end effector 160 advances, for each finger, controller 152 drives a first friction belt 532 and a second friction belt 432. This advances the exposed portions of these belts in a direction opposed to motion of end effector 160 as the end effector 160 moves forward (steps 1306 and 1308). For each finger (290, 292, 294), the first friction belt and the second friction belt may be driven by an amount corresponding with an amount of motion of end effector 160 as end effector 160 moves forward. This means that as fingers (290, 292, 294) are inserted towards object 710, fingers (290, 292, 294) do not push object 710 away from end effector 160. During this process, the first friction belt 532 and the second friction belt 432 may be driven concurrently as end effector 160 moves forward.

After fingers (290, 292, 294) surround object 710 in a loose grip at object 710 (e.g., such that fingers surround object 710 but do not apply force to object 710), controller 152 draws fingers (290, 292, 294) more tightly together in order to increase the amount of gripping force applied to object 710 (step 1310). For example, controller 152 may pivot linkages 250 about end effector base 260, causing fingers (290, 292, 294) to move towards each other and apply force to grasp object 710. Retraction of end effector 160 then proceeds, as end effector 160 is drawn backwards out of stack 920 (e.g., in a direction opposed to its prior forward motion) (step 1312). During this process, controller 152 drives first friction belt 532, advancing an exposed portion of belt 532 in a direction opposed to motion of end effector 160 as end effector 160 retracts is driven in a direction opposed to the motion of end effector 160 (step 1314). This may be performed in a fashion similar to step 1308 above. By performing this action for outward-facing friction belts 532, end effector 160 does not drag on any nearby objects 710 when end effector 160 is retracted.

Concurrently with the advancing of outward-facing friction belts 532 described in step 1314, inward facing friction belts 432 are held in position (step 1316). This ensures that the grasped object 710 is not ejected from end effector 160 when end effector 160 retracts.

After end effector 160 has retracted, the grasped object 710 may be deposited, for example onto a conveyor, and removed. End effector 160 may then proceed to repeat method 1300 for a new object 710. In this manner, by iteratively performing method 1300, an entire storage area 170 (e.g., a cargo hold of an aircraft) may be emptied of objects.

Utilizing method 1300, objects in a stack may be beneficially unloaded without knocking down other objects or otherwise interfering with the stack. This provides a substantial benefit by ensuring that objects are not damaged when they are automatically retrieved by a robot arm.

In a further embodiment, opposed pairs of fingers (290, 292) are aligned such that their tips 440 point slightly towards each other (i.e., inward) before end effector 160 is inserted. Then, during the insertion process as end effector moves forward, tips 440 are angled outward such that the fingers (290, 292) become parallel. If the insertion angle of the fingers (290, 292) creates a perfect parallelism of the exposed portions of frictions belts on those fingers, the fingers (290, 292) may be kept in this configuration throughout the process. Angling of fingers may serve to further push aside adjoining objects 710. This process may help to facilitate the insertion of end effector 160 into the stack.

Examples

In the following examples, additional processes, systems, and methods are described in the context of fingers that utilize friction belts which are capable of engaging in counter-motion as the fingers are moved.

Figure 14:
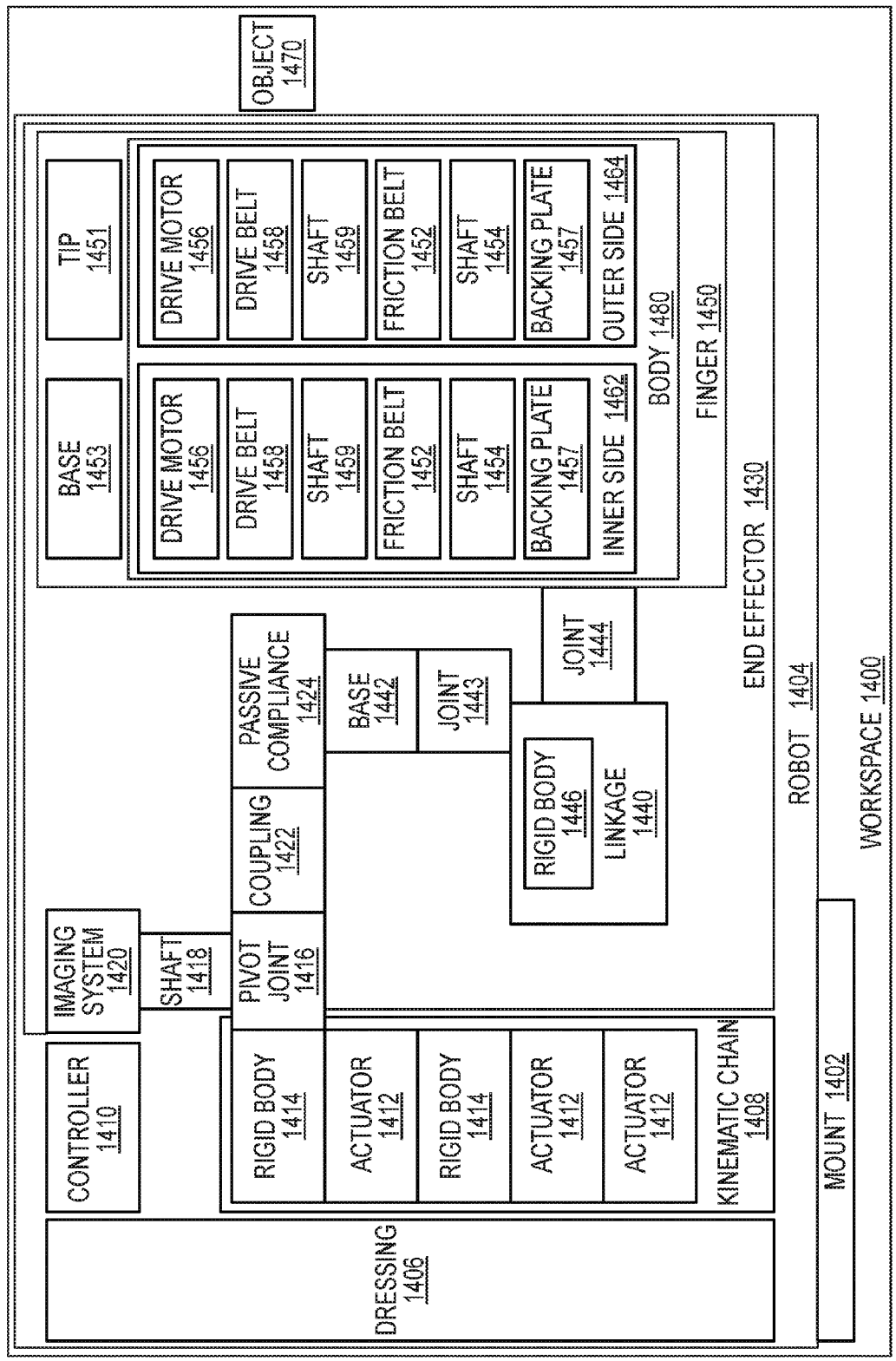
FIG. 14 is a block diagram of a robot in an exemplary embodiment.

FIG. 14 is a block diagram of a robot 1404 operating in a work space 1400 in an exemplary embodiment. In this embodiment, robot 1404 is mounted to mount 1402, and includes dressing 1406. The operations of robot 1404 are managed by controller 1410 and may be mediated based on input from imaging system 1420 (mounted via shaft 1418 to end effector 1430). FIG. 14 further illustrates kinematic chain 1408, which includes actuators 1412 and rigid bodies 1414. Controller 1410 directs kinematic chain 1408, including actuators 1412 and rigid bodies 1414 which are attached to end effector 1430.

End effector 1430 includes pivot joint 1416, coupling 1422, and passive compliance 1424. End effector 1430 further includes end effector base 1442, which is attached to linkages 1440 via joints 1443. Rigid bodies 1446 of linkage 1440 are shown, as are joints 1444 which couple linkage 1440 to finger 1450. Finger 1450 includes finger base 1453, body 1480, and tip 1451. Body 1480 includes inner side 1462, and outer side 1464. Each side of body 1480 includes drive motor 1456, which drives drive belt 1458 via shaft 1450. Shaft 1459 drives friction belt 1452, which is coupled with another shaft 1454. Backing plate 1457 is also depicted. Object 1470 for grasping by end effector 1430 is also shown.

Figure 15:
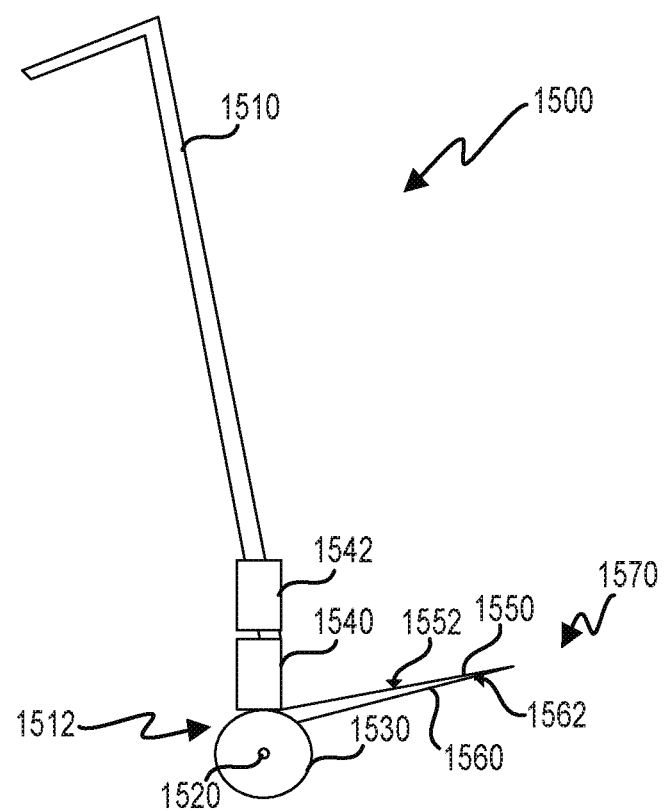
FIG. 15 is a side view of a hand cart utilizing a finger that includes multiple friction belts in an exemplary embodiment.

FIG. 15 is a side view of a hand cart 1500 utilizing a finger that includes multiple friction belts in an exemplary embodiment. Hand cart 1500 may be operated to move heavy objects across a work space. In this embodiment, hand cart 1500 includes rigid frame 1510, axle 1520 which is rotatably attached/mounted to frame 1510, and wheels 1530 which are attached to ends of axle 1520. Hand cart 1500 further includes finger 1570, which is attached to base 1512 of frame 1510 and protrudes from base 1512 of frame 1510. Finger 1570 has an upper surface defined by exposed surface 1552 of a first drivable continuous friction belt 1550, and a lower surface defined by exposed surface 1562 of a second drivable continuous friction belt 1560. As finger 1570 of hand cart 1500 moves underneath an object, exposed surfaces 1552 and 1562 advance along their exposed portions in a direction opposed to the motion of finger 1570. In a further embodiment, friction belts 1550 and 1560 are driven by motor 1542, advancing exposed portions/surfaces 1552 and 1562 in a direction opposed to motion of finger 1570 as finger 1570 advances forward. Brake 1540 is operable to halt motion of first friction belt 1550, without halting motion of second friction belt 1560, as finger 1570 retracts while holding an object. Thus, when finger 1570 is retracted after being placed underneath an object of interest, an operator may utilize brake 1540 to hold upper surface 1552 in position, while lower surface 1562 moves opposed to the direction of retraction.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A system comprising:
   a finger of an end effector of a robot, the finger comprising:
   a finger base;
   a body that extends from the finger base;
   a first continuous friction belt having an exposed portion along a first side of the body;
   a second continuous friction belt having an exposed portion along a second side of the body;
   a motor driving the first friction belt; and
   a motor driving the second friction belt.

2. The system of claim 1 further comprising:
   a controller that drives the first friction belt and the second friction belt.

3. The system of claim 2 wherein:
   the controller advances the exposed portions of the first friction belt and the second friction belt in a direction opposed to motion of the end effector as the end effector moves forward towards an object for grasping.

4. The system of claim 2 wherein:
   the controller advances the exposed portion of the first friction belt in a direction opposed to motion of the end effector as the end effector retracts with a grasped object, while also holding the second friction belt in position.

5. The system of claim 2 wherein:
for each finger, the controller drives the first friction belt and the second friction belt by an amount corresponding with an amount of motion of the end effector as the end effector moves forward.

6. The system of claim 1 wherein:
the first friction belt and the second friction belt are operable to be driven concurrently as the end effector moves forward.

7. The system of claim 1 further comprising:
a stereoscopic camera attached to the end effector.

8. The system of claim 1 further comprising:
a backing plate that separates the exposed portion of the first friction belt from an opposite side of the first friction belt.

9. The system of claim 1 wherein:
the end effector further comprises:
an end effector base; and
the finger is one of multiple opposed fingers that are coupled with the end effector base and are operable to move towards each other to tighten a grip on an object.

10. The system of claim 9 further comprising:
rigid linkages that each extend from the end effector base, each linkage operable to pivot about the end effector base,
wherein the finger is attached to a corresponding linkage, and each finger is operable to pivot about the linkage to which it is attached.

11. The system of claim 10 further comprising:
a controller that directs the linkages to pivot about the end effector base causing the fingers to move towards each other.

12. The system of claim 9 further comprising:
a controller that repositions the end effector by directing a kinematic chain of actuators and rigid bodies attached to the end effector.

13. The system of claim 9 wherein:
the end effector further comprises a coupling that rotates the end effector base.

14. The system of claim 9 further comprising:
an imaging system that provides input for operating the end effector.

15. A method comprising:
for each of multiple fingers of an end effector as the end effector moves forward towards an object:
  driving a first friction belt along a first side of the finger causing an exposed portion of the first friction belt to advance in response to motion of the end effector; and
  driving a second friction belt along a second side of the finger causing an exposed portion of the second friction belt to advance in response to motion of the end effector.

16. The method of claim 15 further comprising:
drawing the fingers together to form a grip on the object.

17. The method of claim 15 wherein:
driving the first friction belt causes the exposed portion of the first friction belt to advance in response to motion of the end effector; and
driving the second friction belt along the second side of the finger causes the exposed portion of the second friction belt to advance in response to motion of the end effector.

18. The method of claim 15 further comprising:
identifying the object for retrieval, the end effector comprising an end effector base and opposed fingers that are coupled with the end effector base and are operable to move towards each other to tighten a grip on an object; and
moving the end effector forward towards the object.

19. The method of claim 15 wherein:
driving the first friction belt and driving the second friction belt comprises:
  driving the first friction belt and driving the second friction belt by an amount corresponding with an amount of motion of the end effector as the end effector moves forward.

20. The method of claim 15 further comprising:
retracting the end effector;
driving the first friction belt, advancing the exposed portion of the first friction belt in a direction opposed to motion of the end effector as the end effector retracts; and
holding the second friction belt in position as the end effector retracts.

21. The method of claim 15 wherein:
drawing the fingers together comprises by pivoting linkages that attach the fingers to a base of the end effector.

22. The method of claim 15 further comprising:
adjusting a distance between the fingers to match a size of the object.

23. The method of claim 22 further comprising:
holding the fingers parallel with each other spaced wide enough to clear the object to be grasped and parallel with edges of the object as the distance is adjusted.

24. A method comprising:
placing a finger of an end effector between two objects, by:
  driving a first continuous friction belt, via a first motor, along a first side of the finger causing an exposed portion of the first friction belt to advance in response to motion of the end effector, the exposed portion of the first friction belt facing a first of the two objects;
  driving a second continuous friction belt, via a second motor, along a second side of the finger causing an exposed portion of the second friction belt to advance in response to motion of the end effector, the exposed portion of the second friction belt facing a second of the two objects; and
moving the end effector relative to the two objects.

25. A non-transitory computer readable medium embodying programmed instructions which, when executed by a processor, are operable for performing a method comprising:
for each of multiple fingers of an end effector as the end effector moves forward towards an object:
  driving a first friction belt along a first side of the finger causing an exposed portion of the first friction belt to advance in response to motion of the end effector; and
  driving a second friction belt along a second side of the finger causing an exposed portion of the second friction belt to advance in response to motion of the end effector.

26. An apparatus comprising:
a rigid frame;
an axle rotatably mounted to a base of the frame;
wheels attached to ends of the axle; and
a finger attached to the base of the frame that protrudes from the base of the frame, the finger comprising:
  a first drivable friction belt having an exposed portion that defines an upper surface of the finger;

a second drivable friction belt having an exposed portion that defines a lower surface of the finger;

a motor that drives the first friction belt and the second friction belt; and a brake that is operable to halt driving of the first friction belt without halting the second friction belt as the finger retracts backward.

27. The apparatus of claim 26, wherein:

the motor advances the exposed portion of the first friction belt and the exposed portion of the second friction belt in a direction opposed to motion of the finger as the finger advances forward.

28. The apparatus of claim 27 wherein:

the brake is operable to hold an upper surface of the first friction belt in position during retraction, while a lower surface of the second friction belt moves opposed to the direction of retraction.

* * * * *